United States Patent [19]
Rosenzweig et al.

[11] Patent Number: 6,130,924
[45] Date of Patent: Oct. 10, 2000

[54] METHOD AND APPARATUS FOR ADMINISTRATIVE CONTROL OVER DATA TRANSMISSION USING DYNAMIC FILTERING IN A MULTICAST NETWORK

[75] Inventors: Phil Rosenzweig, Acton; Miriam Kadansky, Westford, both of Mass.

[73] Assignee: Sun Microsystems, Inc., Palo Alto, Calif.

[21] Appl. No.: 09/062,882

[22] Filed: Apr. 20, 1998

[51] Int. Cl.[7] .................................................. H04B 1/10
[52] U.S. Cl. ........................................ 375/350; 710/100
[58] Field of Search .......................... 375/350; 710/100; 364/222.2, 238, 280, 940.71; 395/500.46, 500.48, 280; 709/300

[56] References Cited

U.S. PATENT DOCUMENTS

| | | | |
|---|---|---|---|
| 5,548,731 | 8/1996 | Chang et al. | 710/100 |
| 5,706,507 | 1/1998 | Schloss | 395/615 |

FOREIGN PATENT DOCUMENTS

| | | |
|---|---|---|
| 0658 837A | 6/1995 | European Pat. Off. . |
| 0 762707A | 3/1997 | European Pat. Off. . |

OTHER PUBLICATIONS

N. Yeadon et al., "Filters: QoS Support Mechanisms for Multipeer Communications," IEEE Journal on Selected Areas In Communications, vol. 14, No. 7, Sep. 1, 1996, pp. 1245–1262.

C.C. Wood, "Logging, Auditing and Filtering for Internet Electronic Commerce," Human Genetics, Aug. 1, 1997, pp. 11–16.

Web Page entitled, "Channel Manager Control Examples, "URL= http://www.microsoft.com/netshow/docs/nets0230.htm, Copyright 1997 Microsoft Corporation, one–page document.

Web Page entitled, "C–H, URL=http://www.microsoft.com/netshow/docs/nets0609.htm," Copyright 1997 Microsoft Corporation, one–page document.

Web Page entitled, "The Guide to Live Webcasting Using Microsoft NetShow 2.0, Some Basic Terms and Concepts," Microsoft NetShow—Guide to Live Webcasting, URL= http://www.microsoft.com/netshow/about/whtepprs/liveguid/2.htm, Copyright 1998 Microsoft Corporation, (last updated Mar. 18, 1998), two–page document.

Amy Rogers and Paul Kapustka, Web Page entitled, "Tech Web News, IP Multicast To Deliver Video to PCs, CMP net, CommunicationsWeek, Apr. 13, 1997, URL=http://www-.techweb.com/wire/news/apr/0413ip.html," four–page document.

D. Brent Chapman and Elizabeth D. Zwicky, "Building Internet Firewalls," Internet Security, 31–page document.

Jerry D. Gibson, The Communications Handbook, 1997, IEEE Press, p. 362.

*Primary Examiner*—Stephen Chin
*Assistant Examiner*—Thomas E McKiernan
*Attorney, Agent, or Firm*—Squire, Sanders & Dempsey L.L.P.

[57] ABSTRACT

A method and apparatus for disseminating filters from an intermediate network entity called an Administrative Control Point (ACP). The ACP sends dynamic filtering information to various ones of the receiving entities in a network. Thus, receivers in the network can have a set of dynamic filters that can differ from all other sets of dynamic filters in the other receivers. When a receiver receives multicast data, it filters the received data using the filters that it received from the ACP before it processes the received data. The ACP can also update and/or change the filters in one or more receivers at a later time. Dynamic filters can be, for example, software modules, software classes, and/or configuration parameters.

33 Claims, 11 Drawing Sheets

FIG. 7
RECEIVING DATA FROM
SENDER (BY RECEIVER)

FIG. 6
LOADING NEW FILTERS
(BY RECEIVER)

FIG. 9

SENDING FILTERS TO POTENTIAL RECEIVERS
(BY ADMINISTRATIVE CONTROL POINT)

FIG. 8

REGISTRATION OF POTENTIAL RECEIVERS
(BY CHANNEL MANAGER)

FIG. 10
UPDATE FILTERS

```
 * A pair of filters that first translate into German, then remove
 * forbidden words
 */
/**
 * A dynamic filter that translates into German
 */
class GermanFilter extends BasicDynamicFilter {
    /**
     * Create a GermanFilter
     */                                          1610
    GermanFilter () {
        setLowerSocket(datagramSocket);  /* input is from the network */
    }

/**
     * Read a packet of data.  This method will block until a packet is
     * available or an exception is thrown.
     *
     * @return the filtered packet of data
     * @exception IOException if an I/O error occurs
     */
    public DatagramPacket receive () throws IOException {
        DatagramPacket dp = null;
        while (dp == null) {
            dp = lowerSocket.receive ();           1612
            return (GermanTranslation (dp));
        }
    }
}
/**
 * A dynamic filter that removes all packets whose data includes
 * forbidden words
 *
 */
class ForbiddenWordFilter extends BasicDynamicFilter {

/**
     * Create a ForbiddenWordFilter.
     */                                          1620
    ForbiddenWordFilter () {
        setLowerSocket(GermanSocket);  /*input is from the German filter: */
    }

/**
     *Read a packet of data.  This method will block until a packet is
     *available or an exception is thrown.
     *
     * @return the filtered packet of data
     * @exception (IOException if an I/O error occurs
     */
    public DatagramPacket receive () throws IOException {
        DatagramPacket dp = null;
        while (dp == null) {                    1622
            dp = lowerSocket.receive ():
            return(filterForbiddenWords(dp)):
        }
    }
}
```

1602

1604

METHOD AND APPARATUS FOR ADMINISTRATIVE CONTROL OVER DATA TRANSMISSION USING DYNAMIC FILTERING IN A MULTICAST NETWORK

BACKGROUND OF THE INVENTION

The present invention relates generally to computer networking and, specifically, to a method and apparatus allowing an intermediate control point to send different sets of filters to various receivers in a multicast network.

Multicast networking protocols enable data transmission from one sender to many receivers on a data network. Multicasting is usually used as an alternative to establishing individual connections between a sender and each receiver, yielding benefits in network bandwidth utilization and the ability to deliver real-time data. Certain conventional systems include receivers that selffilter, translate, or augment their received data. These conventional systems, however, lack flexibility and have no mechanism for sharing particularly useful filters among receivers in the system. They are difficult to update with consistency.

SUMMARY OF THE INVENTION

Consistent with the present invention, one embodiment includes an intermediate network entity called an Administrative Control Point (ACP). The ACP sends dynamic filtering information to various receiving entities (receivers) in a network. When one of these receivers receives multicast data, it filters the received data using the filters that it received from the ACP before it processes the received data. The ACP can also update and/or change the filters in one or more receivers at a later time.

Dynamic filters can be, for example, executable software modules, software classes, and/or configuration parameters. The dynamic filter set in a receiver can be changed as the need arises. For example, dynamic filters can be classes, such as those found in the Java programming environment. ("Sun," the Sun logo, "Sun Microsystems", "Java" and all Java-based trademarks and logos are trademarks or registered trademarks of Sun Microsystems, Inc. in the United States and other countries.) As another example, dynamic filters can be configuration parameter values that have meaning to the receiver that will be using the filters.

Consistent with the present invention is used in the environment of a multicast channel network. In a multicast channel network, data is sent over a logical construct called a "channel." Senders let potential receivers know that data is going to be transmitted over a channel and specify setup parameters to the receivers. In response, the receivers let the sender know that they are waiting for the data. Receivers bind or link to a channel associated with the sender via a registration process. In an embodiment consistent with the present invention, when a potential receiver registers, the ACP sends a set of filters to the potential receiver. The potential receiver then filters received information in accordance with the filters before passing it to an application program.

Receivers can be end users and can also be intermediate entities, such as firewalls or boundary points. Data sent by the sender can be information, such as video or audio data. It can also be executable software, such as word processor software.

Thus, even though a sender may send the same data to every receiver in a multicast networking system, the receivers can filter the received information in a manner specific to each receiver. Moreover, the receivers themselves do not ultimately decide how their data is to be filtered. That decision is made by an intermediate Administrative Control Point, which then sends appropriate filtering mechanisms to the receivers that will be receiving data from the senders. Use of one or more intermediate Administrative Control Points allows the system to be very flexible. For example, a new filter can be sent out via an update procedure to all receivers that would benefit from the filter. Use of one or more intermediate Administrative Control Points also allows changes reflecting changing system-wide policies to be made quickly and easily in all affected receivers. Use of one or more Administrative Control Points also makes it easy for a user/receiver to move from one physical computer to another, since registration on the new computer will cause the appropriate filters to be loaded into the new computer.

In accordance with the purpose of the invention, as embodied and broadly described herein, the invention relates to a method performed by an Administrative Control Point in a data processing network system, comprising the steps, performed by the Administrative Control Point, of: receiving an indication that a potential receiver of data in a group of potential receivers of data is ready to receive data; determining a set of filters for the potential receiver; and sending the set of filters to the potential receiver.

In further accordance with the purpose of the invention, as embodied and broadly described herein, the invention relates to a method, performed in a data processing network system, comprising the steps of: receiving a set of filters, by a receiver in a group of potential receivers of data, from an Administrative Control Point; receiving, by the receiver, data from a sender; and filtering, by the receiver, the received data in accordance with the set of filters received from the Administrative Control Point.

Advantages of the invention will be set forth in part in the description which follows and in part will be obvious from the description or may be learned by practice of the invention. The objects and advantages of the invention will be realized and attained by means of the elements and combinations particularly pointed out in the appended claims and equivalents.

BRIEF DESCRIPTION OF THE DRAWINGS

The accompanying drawings, that are incorporated in and constitute a part of this specification, illustrate several embodiments of the invention and, together with the description, serve to explain the principles of the invention.

DETAILED DESCRIPTION OF EMBODIMENTS

Reference will now be made in detail to embodiments consistent with the present invention, examples of which are illustrated in the accompanying drawings. Wherever possible, the same reference numbers will be used throughout the drawings to refer to the same or like parts.

I. General Discussion

Figure 1:
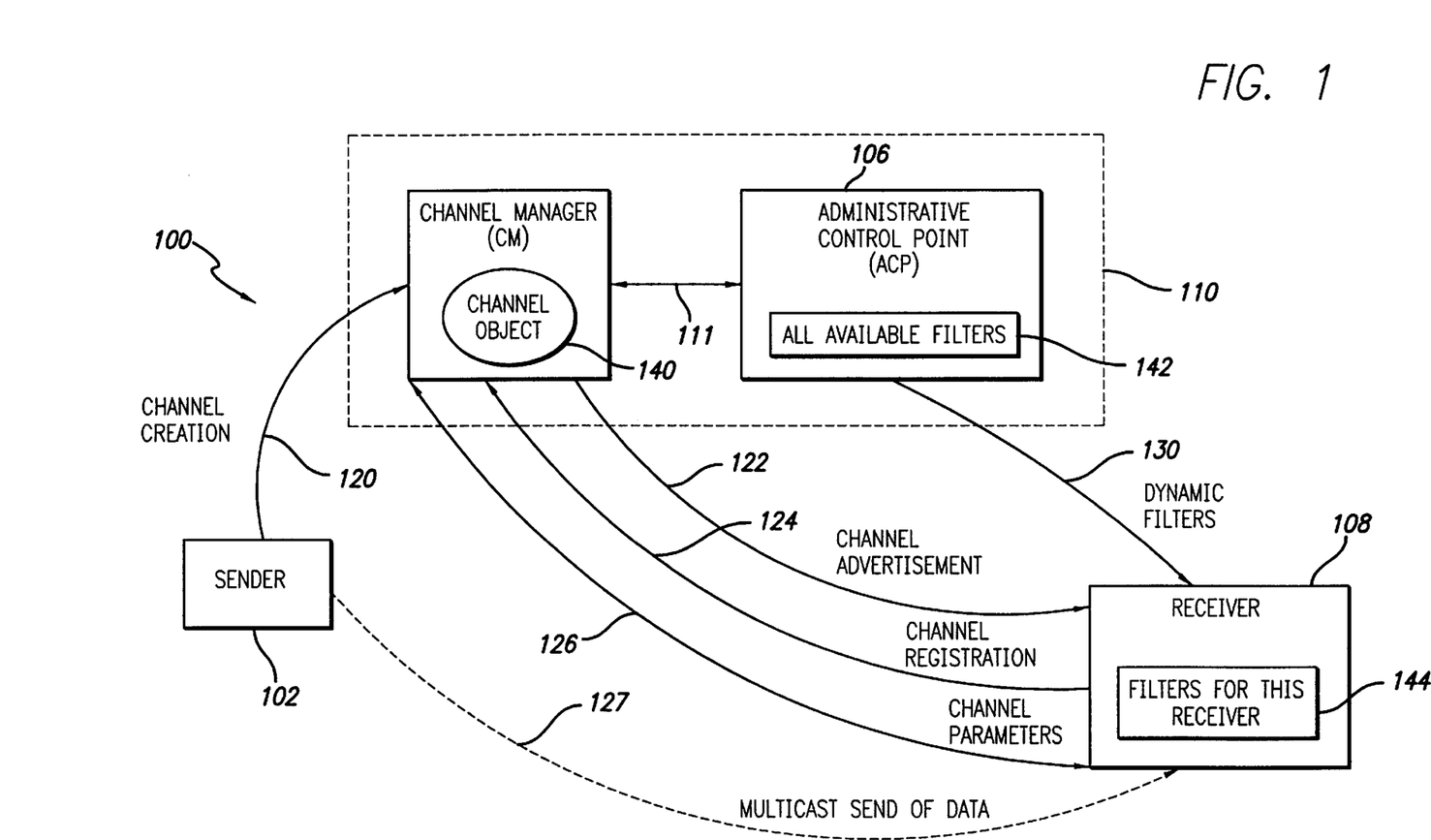
FIG. 1 is a block diagram of a network data processing system in accordance with an embodiment consistent with the present invention, including a sender, a Channel Manager, an Administrative Control Point, and a receiver.

FIG. 1 is a block diagram of a network data processing system 100 in accordance with an embodiment consistent with the present invention, including a sender 102, a Channel Manager (CM) 104, an Administrative Control Point (ACP) 106, and a receiver 108. Although they are shown separately, it should be understood that CM 104 and ACP 106 can also be combined into a single unit 110. Although only one ACP is shown, the system can contain multiple ACPs. Multiple ACPs, if present, contribute to redundancy and load-balancing. Redundancy means that, If one ACP is unavailable, others of the multiple ACPs can continue to operate. Load balancing distributes processing and communications activity evenly across a computer network so that no single device is overwhelmed. There can also be multiple receivers 108.

The exemplary network of FIG. 1 is a multicast network in which a single sender can multicast 127 data to a large number (or all) of the receivers 108 in the network. The general concept of multicasting is well-known and will not be described in detail herein. Multicasting is further described in T. Maufer, "Deploying IP Multicast in the Enterprise," Prentice Hall PTR, Upper Saddle River, N.J. 1998, which is herein incorporated by reference to the extent that it is not inconsistent with the present invention. It should be understood that the present invention is not necessarily limited to multicasting networks using IP multicasting and can be incorporated in any network in which a sender sends data that is received by more than one receiver.

FIG. 1 shows an embodiment consistent with the present invention incorporated into a multicast channel system. It should be understood that the multicast channel system environment is shown by way of example only and that the present invention can be included within a wide variety of data processing systems in which data is sent between a sender and more than one receiver and in which filters are sent to potential receivers from an intermediate Administrative Control Point.

In a multicast system, it is often useful to provide a tight linkage between the sender and each receiver to log or record that each specific receiver is listening for the data sent by the sender. In the example of FIG. 1, data is sent over a logical construct called a "channel." Examples of multicast channel systems include various "push" technologies in which content is broadcast from a sender to many receivers. Push technology can be used to send news, music, or other types of data to registered receivers.

In preparing for a multicast transmission over the channel, the sender needs to let potential receivers know that data is going to be transmitted over a channel and to specify setup parameters to the receivers. In response the receivers will want to let the sender know that they are listening and waiting for the data. The potential receivers do this by binding or linking to the channel associated with the sender. This binding process is called "registration." In order to register to receive a channel, receiver 108 sends a message to CM 104. CM 104 determines the identity and associated parameters of the receivers who have logical connections to sender 102. During registration, CM 104 communicates with ACP 106, causing ACP 106 to apply a management policy expressed as dynamic filters to receivers in the network. As described in more detail below, each receiver subsequently uses its dynamic filters to filter received data. The present invention allows each receiver in the system to receive the same subset or a different subset of the filters in CM/ACP 110.

Figure 2:
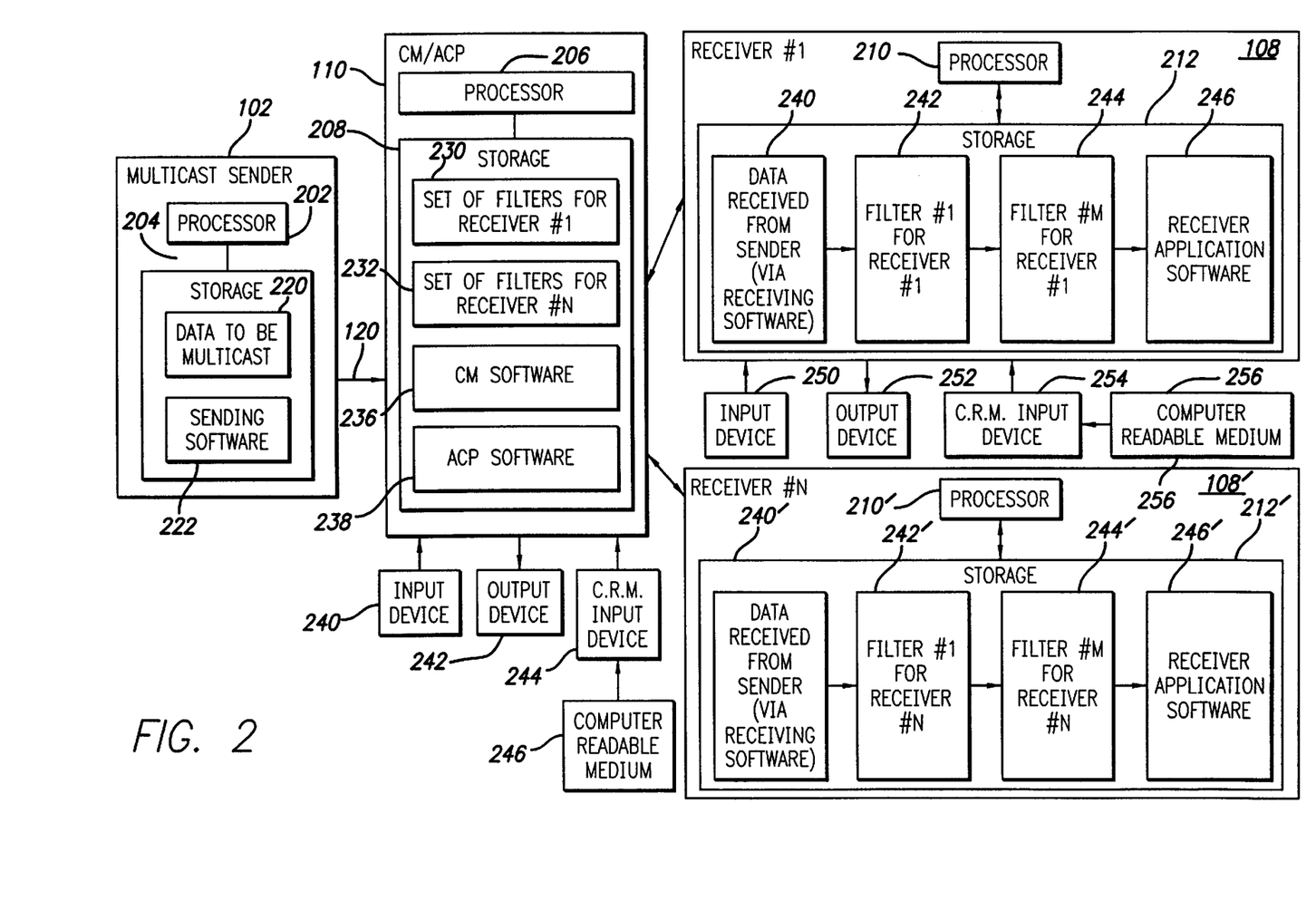
FIG. 2 shows details of examples of elements of the diagram of FIG. 1.

FIG. 2 shows details of examples of sender 102, CM/ACP 110, and a plurality of receivers 108 of the diagram of FIG. 1. Each of sender 102, CM/ACP 110, and receivers 108 is shown as including respective processors 202, 206, 210 and respective storage areas (such as a memory) 204, 208, 212. Storage area 204 in sender 102 includes at least application data to be multicast by sender 102 and software 222 to accomplish the sending. Storage area 208 in CM/ACP 110 includes at least a plurality of filters 230, 232; CM software 236; and ACP software 238 (plus receiving and sending software to receive and send packets—not shown). Storage area 212 in receiver 108 includes receiving software (not shown) for receiving data over connection 111; data 240 received from the sender (e.g., via a multicast send); a plurality of filters 242, 244; and receiver application software 246.

Although, in FIG. 2, each of sender 102, CM 104, ACP 106, and receiver 108 is shown in a separate data processing system/network element, it should be understood that one or more of elements 102, 104, 106, and 108 can be resident on the same data processing system/network element. Furthermore, the functionality of elements 102, 104, 106, and 108 could be distributed between additional data processing systems, nodes, or network elements (not shown) without departing from the spirit and scope of the present invention. For example, an example in which CM 104 and ACP 106 are resident in different network elements is shown in FIG. 1.

CM/ACP 110 preferably includes an input device 240, such as a keyboard, a touchpad, or a mouse that receives input from a user or other appropriate source. CM/ACP 110 preferably also includes an output device 242, such as a display screen, a printer, etc. that outputs information to the user or other appropriate destination. In addition, CM/ACP 110 preferably includes a computer readable medium input device 244, which is capable of reading a computer readable medium 246.

Each receiver 108 includes an input device 250, such as a keyboard, a touchpad, or a mouse that receives input from a user or other appropriate source. Each receiver 108 also includes an output device 252, such as a display screen, a printer, etc. that outputs information to the user or other appropriate destination. In addition, each receiver 108 includes a computer readable medium input device 254, which is capable of reading a computer readable medium 256.

A person of ordinary skill in the art will understand that systems of FIG. 2 may also contain additional information, such as input/output lines; input devices, such as a keyboard, a mouse, and a voice input device; and display devices, such as a display terminal. The systems of FIG. 2 may also may include application programs, operating systems, data, etc., which are not shown in the figure for the sake of clarity. It also will be understood that system 100 can also include numerous elements not shown, such as disk drives, keyboards, display devices, network connections, additional memory, additional CPUs, additional processors, LANs, input/output lines, etc.

In the following discussion, it will be understood that the steps of methods and flow charts discussed preferably are performed by processor 202, 206, 210 (or another appropriate processor) executing instructions stored in respective storage areas 204, 208, 212 (or other appropriate memories). Specifically, the steps described herein are performed by one of CM software 236, ACP software 238, or filtering software in at least one of receivers 108. It will also be understood that the invention is not limited to any particular implementation or programming technique and that the invention may be implemented using any appropriate techniques for implementing the functionality described herein. The invention is not limited to any particular programming language, operating system, or network protocol.

Some or all of the instructions and data structures in storage areas 204, 208, 212 may be read into memory from a computer-readable media 246, 256 (or an other appropriate computer readable medium). Execution of sequences of instructions contained in the storage areas causes processors 206, 210 (or any other appropriate processor) to perform the process steps described herein. In alternative embodiments, hard-wired circuitry may be used in place of or in combination with software instructions to implement the invention. Thus, embodiments consistent with the invention are not limited to any specific combination of hardware circuitry and software.

The systems of FIG. 2 can include a computer readable medium input device 254, 264, which reads computer readable medium 256, 266. The term "computer-readable medium" as used herein refers to any medium that participates in providing instructions to a processor for execution. Such a medium may take many forms, including but not limited to, non-volatile media, volatile media, and transmission media. Non-volatile media includes, for example, optical or magnetic disks, such as a storage device. Volatile media includes dynamic memory. Transmission media include coaxial cables, copper wire and fiber optics, including the wires that comprise a bus within a computer. Transmission media can also take the form of acoustic or light waves, such as those generated during radio-wave and infra-red data communications, or electrical signals transmitted over a computer network.

Common forms of computer-readable media include, for example a floppy disk, a flexible disk, a hard disk, magnetic tape, or any other magnetic medium, a CD-ROM, any other optical medium, punchcards, papertapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions of ACP software 238 may initially be carried on a magnetic disk or a tape. The instructions are loaded into storage area 208. Alternately, instructions can be sent over a telephone line using a modem. A modem local to the computer system can receive the data on the telephone line and use an infra-red transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor.

II. Various Network Elements Can Act as Receivers

Figure 3:
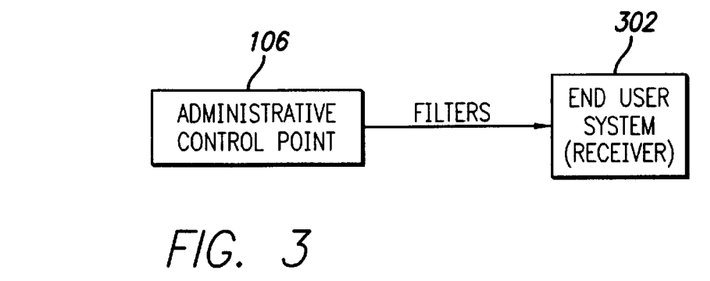
FIG. 3 shows an example of a data processing system in which a receiver is an end user system.
Figure 4:
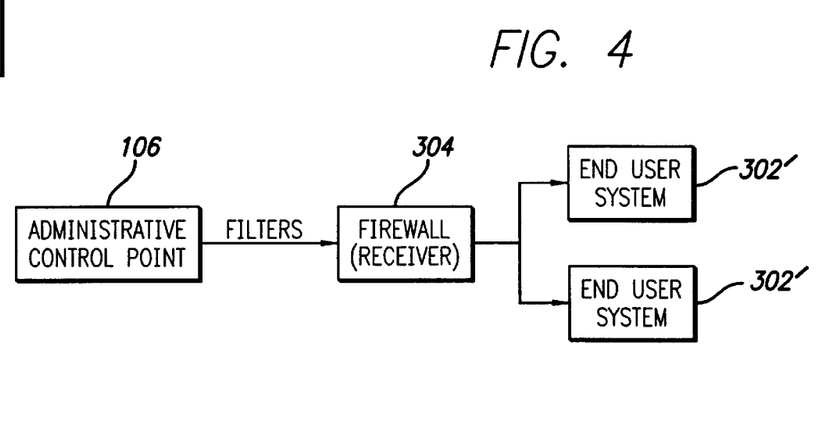
FIG. 4 shows an example of a data processing system in which a receiver is a firewall.
Figure 5:
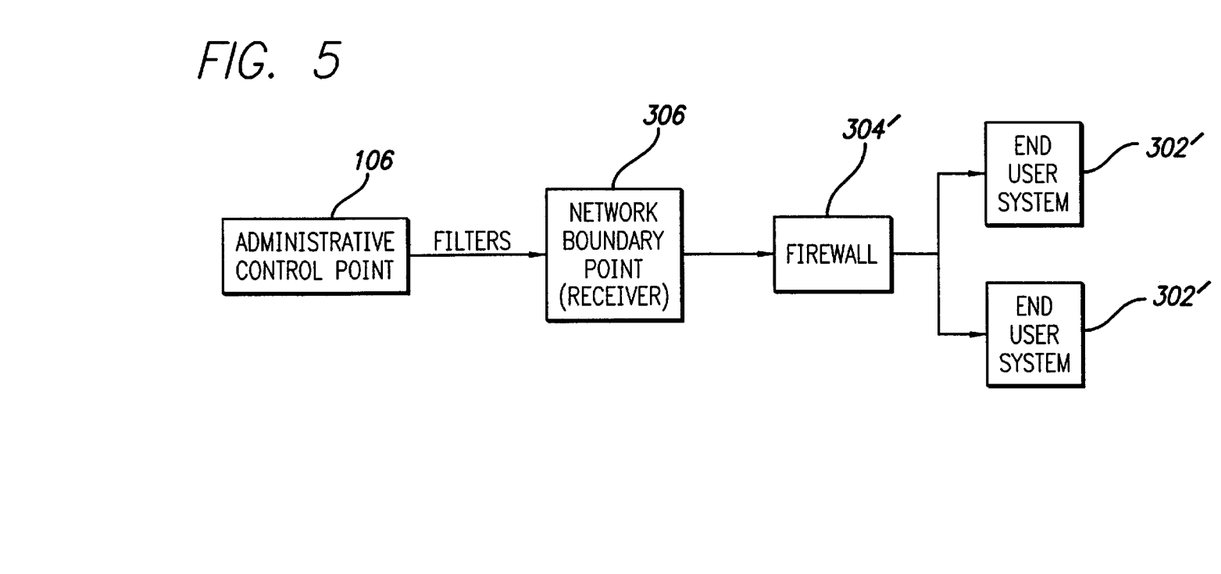
FIG. 5 shows an example of a data processing system in which a receiver is a network boundary point.

FIGS. 3–5 show various possibilities as to which elements in a data processing system can fill the role of receivers. FIG. 3 shows an example of a data processing system in which a receiver is an end user system 302. Thus, the filters sent by ACP 106 are loaded directly onto end user system 302, which performs filtering on received data as described below.

FIG. 4 shows an example of a data processing system in which a receiver is a firewall 304. Firewall 304 checks all received multicast packets in accordance with its set of filters and filters received data in accordance with its filters. Filters in a firewall, for example, can either alter the data before passing it to the end users or can only allow data through that meets certain predetermined criteria. Firewall 304 then passes data to one or more end user systems 302'.

FIG. 5 shows an example of a data processing system in which a receiver is a network boundary point 306. A network boundary point is defined as any point in a network where it is determined whether data packets are allowed to pass. For example, it may be desirable to contain all multicast traffic within a specific boundary formed by a group of network boundary points. As a second example, only certain types of packets or packets from a certain source may be allowed to pass the boundary point. It should be understood that FIGS. 3–5 are exemplary only and that any appropriate network element can act as a receiver (and therefore contain dynamic filters).

III. Loading Filters From an Administrative Control Point

Figures 6, 7:
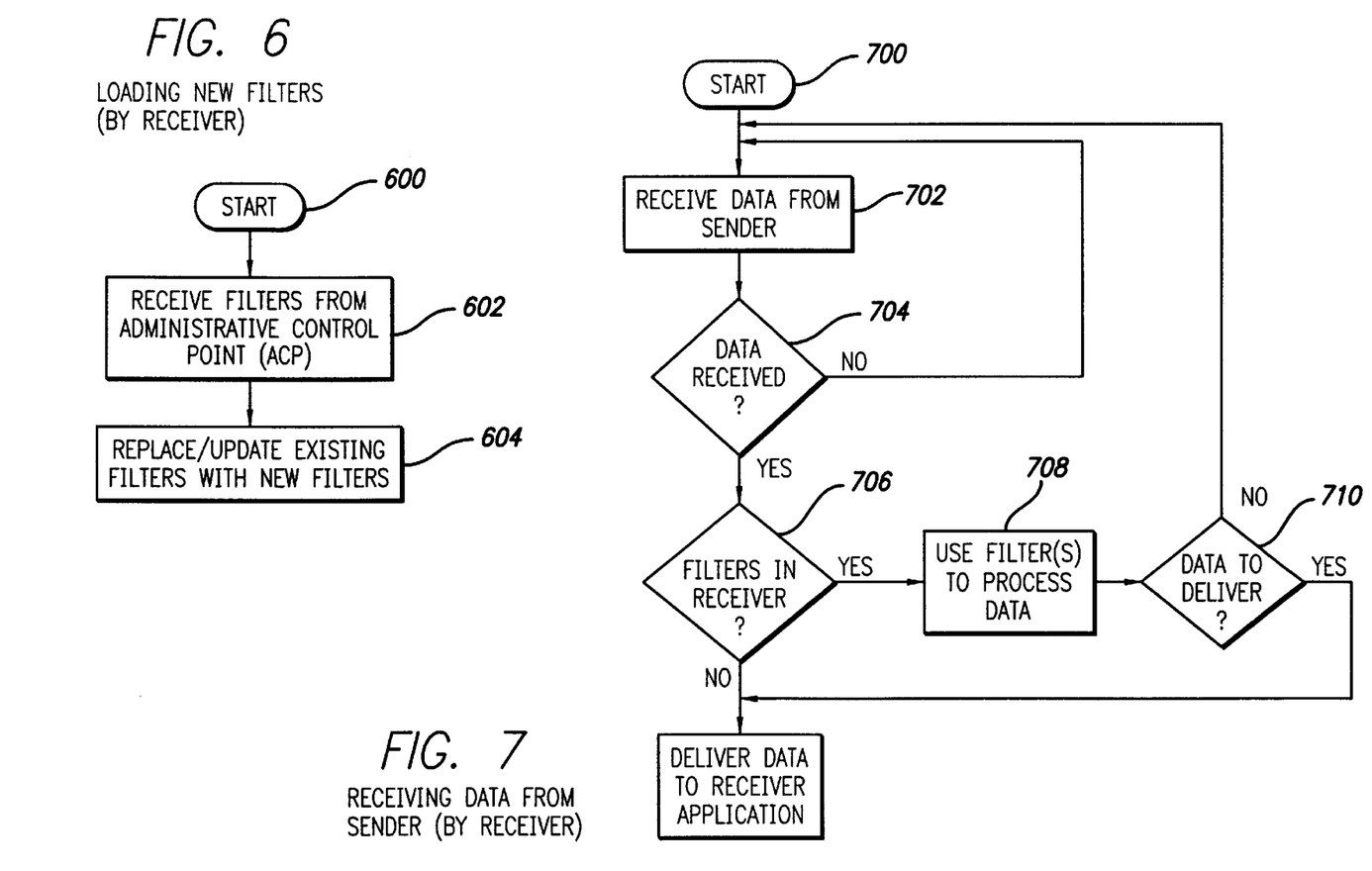
FIG. 6 is a flow chart showing steps performed by a receiver to load a new set of filters from the Administrative Control Point.
FIG. 7 is a flow chart showing steps performed by a receiver to filter received data in accordance with filters in the receiver.

FIG. 6 is a flow chart 600 showing steps performed by receiver 108 to load a new set of filters that are sent from ACP 106. As discussed above, in the described embodiment, ACP sends filters to a receiver when the receiver registers with CM 104 to receive a channel. Thus, in step 602, receiver 108 receives a plurality of filters from ACP 106. The actual mechanism by which filters are transmitted can be any appropriate mechanism, depending on the type of filters used in the specific receiver 108. In step 604, the existing filters in the receiver (if any) are replaced by the new filters. Alternately, the new filters can be added to any existing filters. As yet another alternate, the new filters can selectively replace certain ones of the filters in the receiver, in accordance with information sent along with the filters.

It is important to understand that the filters are stored in receiver 108 in accordance with an order determined by ACP 106. The order in which the filters are stored is the order in which they are applied to received data. This order can be implicit in the order of the newly received filters, or can be explicit, in accordance with information sent along with the filters.

Figure 13:
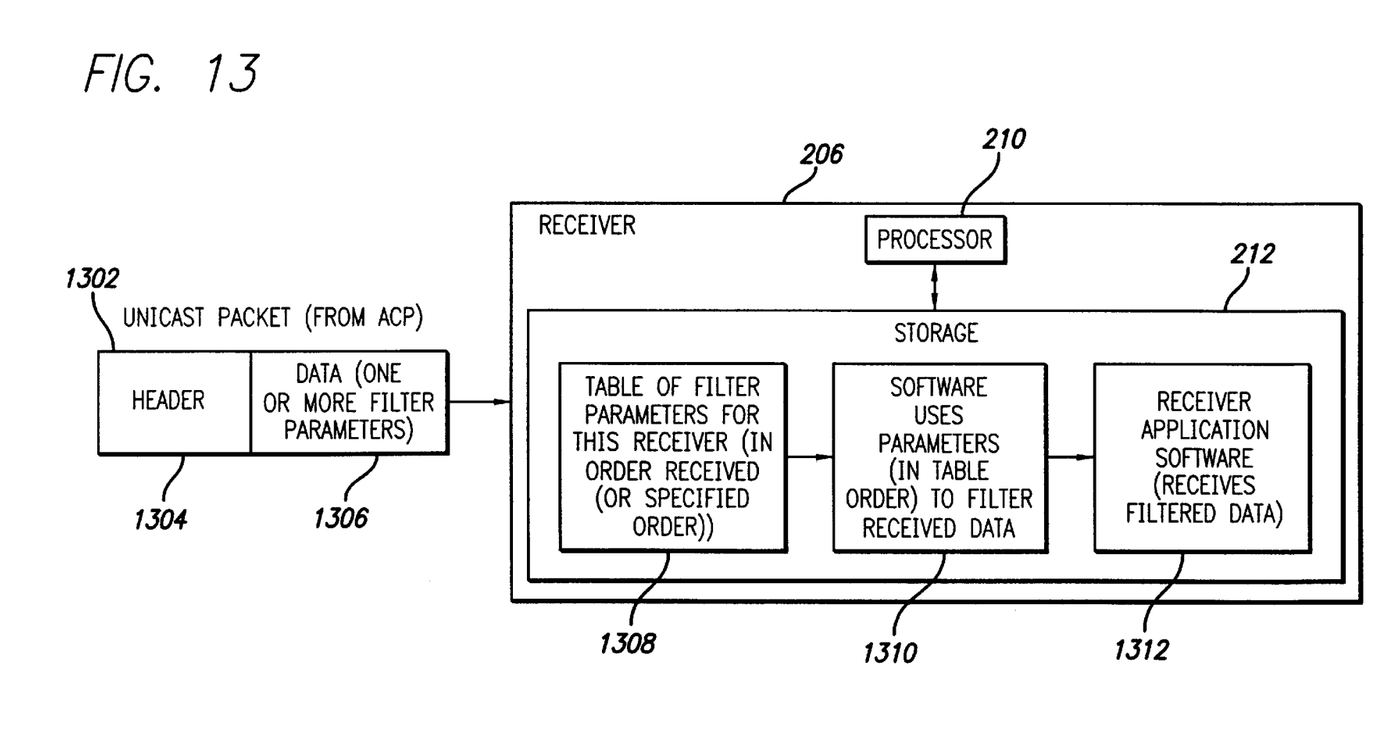
FIG. 13 is a block diagram showing an example in which the filters sent from the Administrative Control Point are parameters.

As discussed above, a filter can be, for example, a software module, a Java class, or a parameter. Downloadable Java classes are described generally in Cornell & Horstmann, *Core Java 1.1: Fundamentals*, published by Prentice Hall (SunSoft Press) 1997, published by Prentice Hall (SunSoft Press), which is herein incorporated by reference to the extent that it is not inconsistent with the present invention. FIG. 13 shows an example in which the filters sent from ACP 106 are parameters. In the example, the filters are unicast in a packet 1302 from ACP 106 to the potential receiver 108 and stored in a table 1308 in the receiver 108, either in the order sent from ACP 106 or in an order specified along with the filters. The filter set could also be units to all or to a subgroup of potential receivers 108. Software 1310 retrieves each of the filters in order and applies them to received data, prior to passing the received data to an application program 1310.

Figure 14:
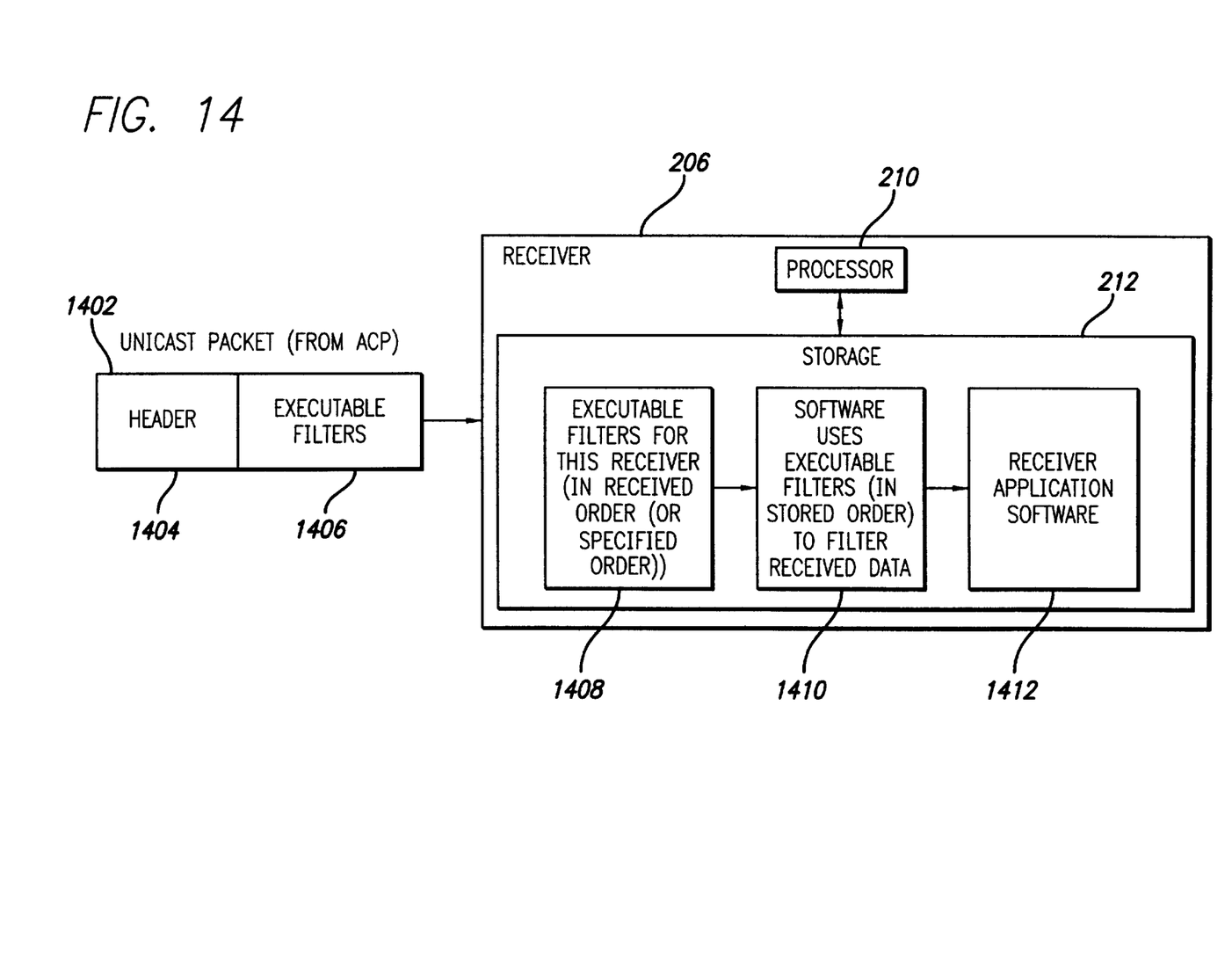
FIG. 14 is a block diagram showing an example in which the filters sent from the Administrative Control Point are executable modules.

FIG. 14 is a block diagram showing an example in which the filters sent from the ACP 106 are executable modules. In the example, the filters are unicast in a packet 1402 from ACP 106 to the potential receiver 108 and stored in the receiver 108, either in the order sent from ACP 106 or in an order specified along with the filters. As data is received, software, such as the operating system (OS) executes each of the filters in order and applies them to received data, prior to passing the received data to an application program 1410.

Figure 15:
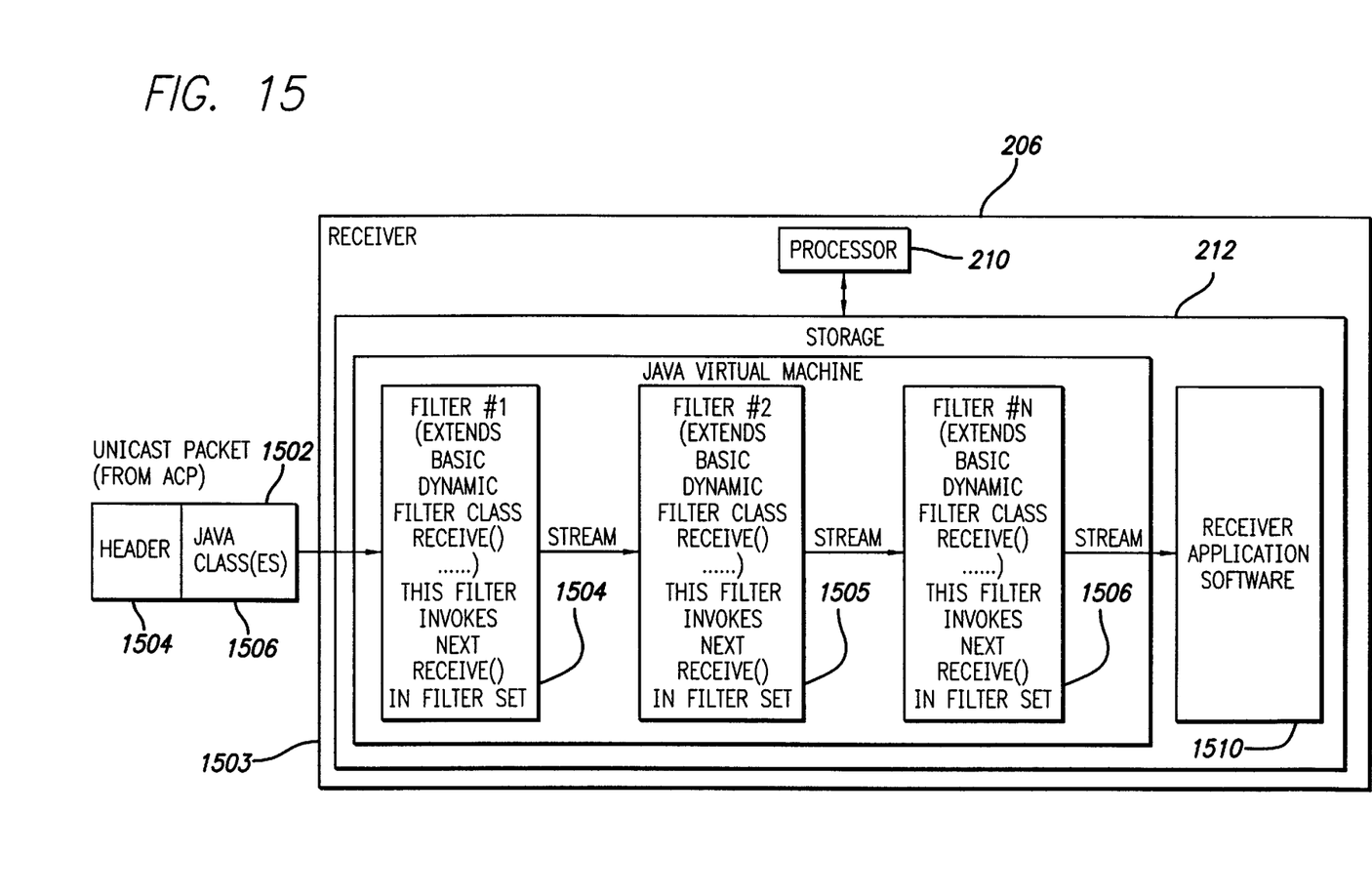
FIG. 15 is a block diagram showing an example in which the filters sent from the Administrative Control Point are Java classes.

FIG. 15 is a block diagram showing an example in which the filters sent from the ACP 106 are Java classes. In the example, the filters are sent as downloadable Java classes 1502 from ACP 106 to the potential receiver 108 and stored in the receiver 108. In the example, the filters are Java classes that are extensions of a class whose receive method is overwritten. The method in a first filter receives data, processes it, and passes it to the next filter by invoking the receive method in the next filter. In the example, the order in which the filters are performed is determined and specified by ACP 106. As shown in step 904 of FIG. 9, the ACP sets each filter in a receiver's filter set to invoke the next lowest filter in the filter set.

Thus, data is passed from each filter in the filter set to a respective next filter. In the described embodiment, data is passed from one filter to another using Java streams or the datagram packet class. As data is received in receiver 108, the Java virtual machine 1504 applies each of the filters, in order, to the received data, prior to passing the received data to an application program 1510.

IV. Filtering Data Received from a Sender

FIG. 7 is a flow chart 700 showing steps performed by a receiver to filter received data in accordance with filters in the receiver received from ACP 106. In the described embodiment, this data is multicast data sent from a sender 102 to a plurality of receivers, each of which can filter the received data differently, depending on the filters received from ACP 106. Alternately, the data can be sent using some scheme other than IP multicasting, as long as data sent by the sender is received by more than one receiver.

In step 702, receiver 108 receives the multicast data. If the data is received and there are filters in receiver 108 (steps 704 and 706), then receiver 108 uses its dynamic filters to process the data. If the filter is of a type that changes or augments the data (or if the filters pass the data through) in step 710, the data is delivered to receiver application software 246.

It should be understood that there are a huge number of potential filtering functions that can be performed by filters in accordance with the present invention and it is not practicable to list all possible filters. In general, filters can either augment the data, change the data, or decide whether to let the data past the filter.

An example of augmenting the data would be to add version numbers, time of day, or identification specific to the receiver to the received data. Another example of augmenting data would be to place constraints on executable game software received as data. For example, it might be desirable to place age appropriate limits on certain games received by certain receivers. Another example of augmenting the data would be to personalize the received data for the particular receiver, such as by adding the name or other personal information of a human being associated with the receiver.

An example of changing the received data would be a translation filter, in which received data in a first language is translated to a second language by the filter. Another example of changing the received data would be to monitor the received data for "bad language" and delete or alter the bad language to more acceptable usage. Another example of changing the data would be to create a "personalized newspaper" for the receiver, choosing portions of received content according to criteria previously specified by the receiver.

Filtering the received data to restrict passage of certain received data through the receiver is useful for firewalls and network boundary points, although such filters could also be present in end user systems or other appropriate receivers. In the case of firewalls and boundary points, an end user system is further down stream in the network and will receive the data from the firewall or boundary point if the filter passes the data through. An example of restricting passage of received data via a filter restricts the passage of packets at certain times of day or under certain circumstances (such as if an account fee is unpaid). In another example the filter restricts packets received from certain senders to within certain boundary points of a network. Another example might be restricting the passage of certain packets if a receiver is not qualified to pass those packets (such as if the receiver has not paid for premium access to data). Another example might provide a virus check and only let executable software (data) that appears virus-free to pass.

It is important to note that the order of the filters specified, either implicitly or explicitly by ACP 106 is important, since the order in which the filters are applied to received data may make a difference in the result. For example, if a translator filter is applied prior to a "bad language" filter, certain objectionable terms may not get filtered out. On the other hand, if the received data is first filtered for bad language and then translated, a more desirable result may occur (unless, or course, translation is assumed to happen before bad language filtering). As discussed above, the order of the filters is determined in ACP 106 and the filters in a particular filter set are set up to reflect that order.

Figure 16:
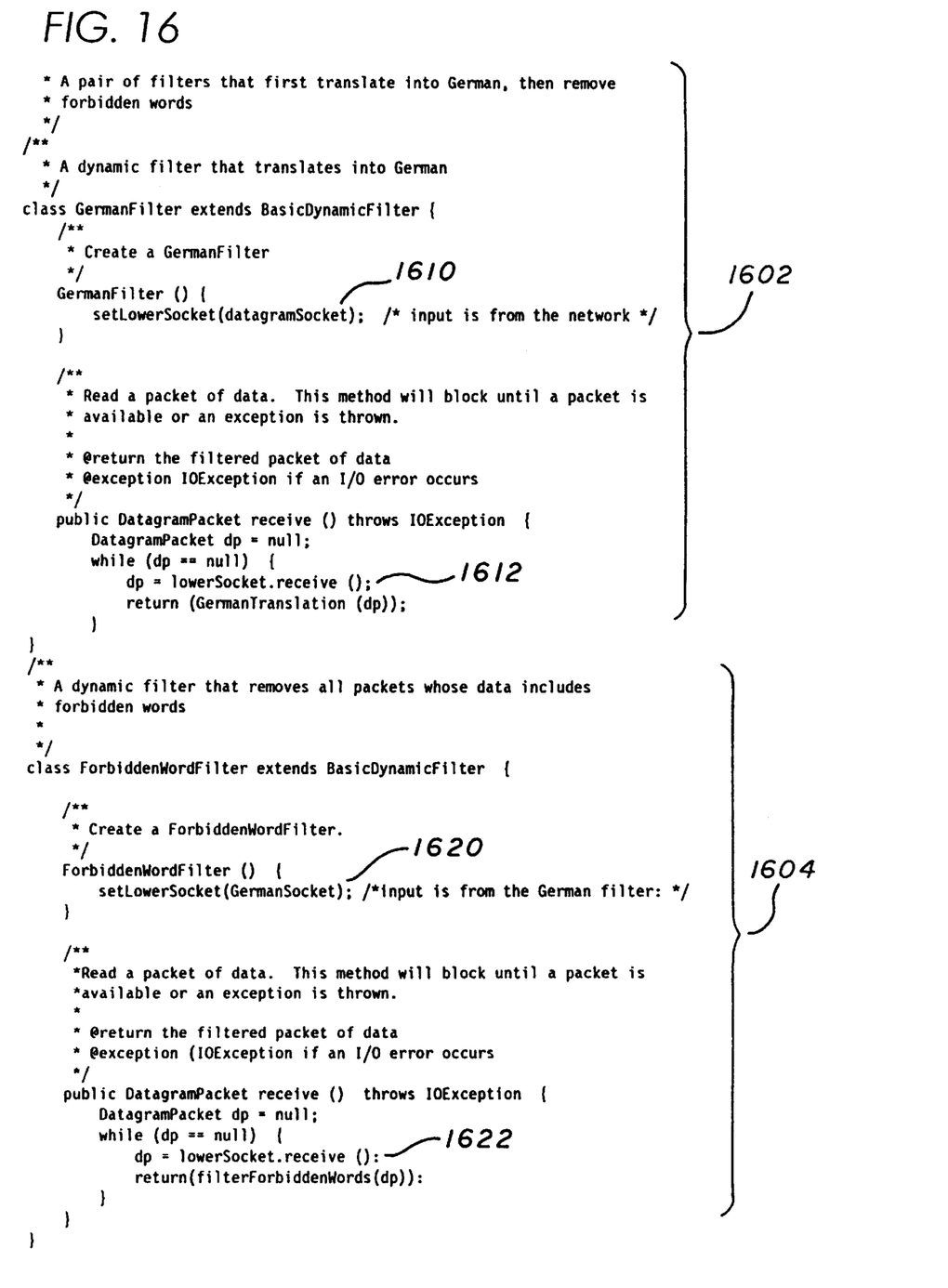
FIG. 16 shows an example of a filter set, where the filters are Java classes.

FIG. 16 shows an example of a filter set consistent with the present invention, where the filters are Java classes. The filter set of FIG. 16 includes a first filter GermanFilter 1602 that translates input into German and a second filter ForbiddenWordFilter 1604 that removes forbidden words from input data. In the example, ACP 106 has set up filters 1602 and 1604 so that first filter 1602 will receive input from the network (statement 1610), while second filter 1604 will receive input from first filter 1602 (statement 1620). Statement 1612 in first filter 1602 receives input from the network, while statement 1622 in second filter 1604 receives input from first filter 1602.

In an alternate embodiment, ACP 106 can set up a vector representing an order of filters in a filter set. Receiver 108 executes the filters in accordance with the order specified in the vector.

V. Sending Filters from the Administrative Control Point

Figure 8:
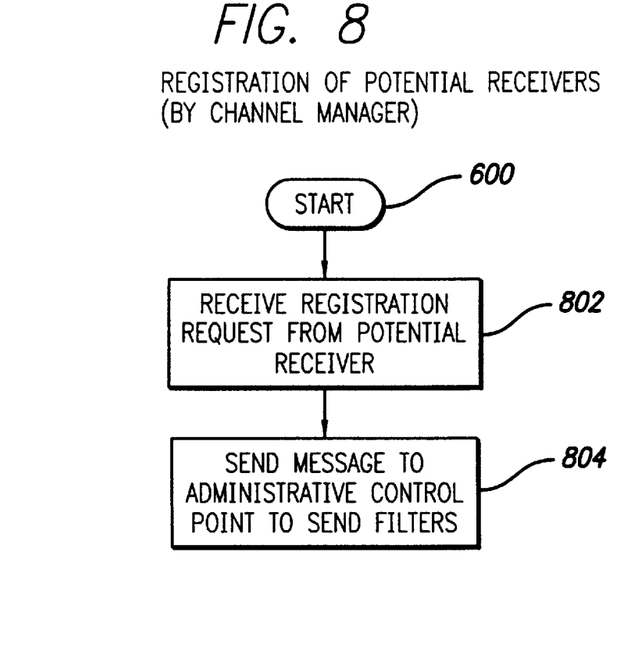
FIG. 8 is a flow chart showing steps performed by the Channel Manager when the receiver registers for a channel.

FIG. 8 is a flow chart showing steps performed by CM 104 when the receiver registers for a channel. As described above, while the present invention is described herein in connection with a multicast channel environment by way of example, the present invention is not limited to such an environment and can be used in any appropriate environment in which data is received by multiple receivers, which are sent filters from at least one intermediate control point.

In step 802, CM 104 receives registration information from a potential receiver 108. In step 804, CM 104 sends a command, message or instruction to ACP 106 instructing it to send a set of predetermined filters to the newly registered potential receiver 108.

Figure 9:
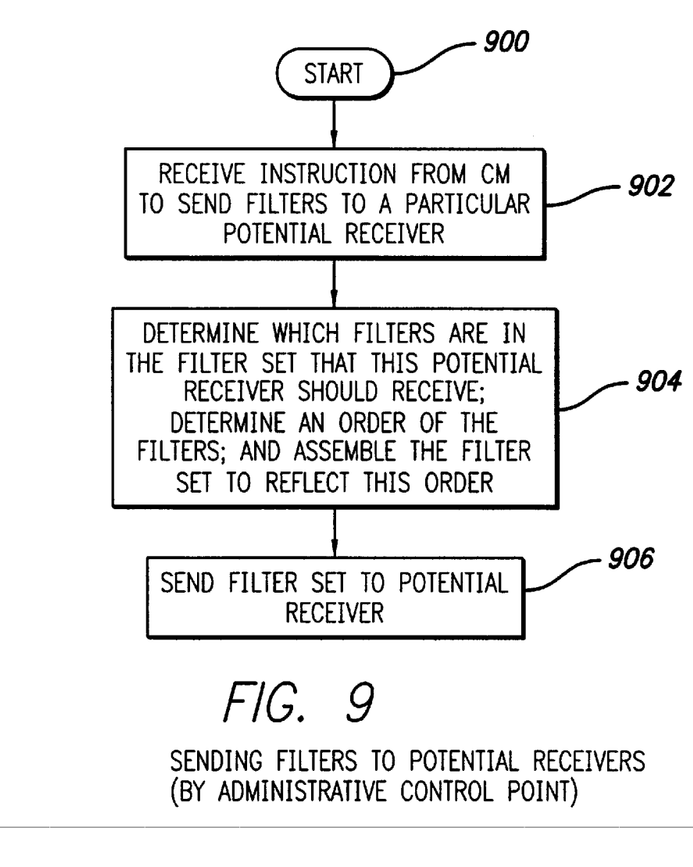
FIG. 9 is a flow chart showing steps performed by an Administrative Control Point to send filters to a potential receiver.

FIG. 9 is a flow chart showing steps performed by ACP 106 to send filters to the potential receiver 108. In step 902, ACP 106 receives the command, message, or instruction from step 804. In step 904, ACP 106 determines which filters are in the filter set that this potential receiver should receive. In the described embodiment, this filter set is predetermined by a system manager or some other intermediate authority. It may also be possible for ACP 106 to enter into a dialog with receiver 108 in which receiver 108 requests and ACP 106 grants or denies various types of filters to receiver 108. ACP 106 changes the filters in the filter set to reflect the determined order. In step 906, ACP 106 sends the filter set to potential receiver 108 as, for example, unicast data (as shown in FIGS. 13 and 14), as a downloadable Java class (as shown in FIG. 15), or using any other appropriate sending mechanism.

At least one embodiment consistent with the present invention buffers received data packets and filters the received data packets as a group. For example, several received data packets taken together may form a document that needs to be translated by an applicable dynamic filter. In at least one other embodiment consistent with the present invention, data packets are filtered as they are received and are not buffered. Still other embodiments consistent with the present invention include some receivers that buffer received data and some receivers that do not buffer received data. In still other embodiments consistent with the present invention, a particular receiver only buffers certain predetermined types of data packets, while it does not buffer other types of data packets.

Figure 10:
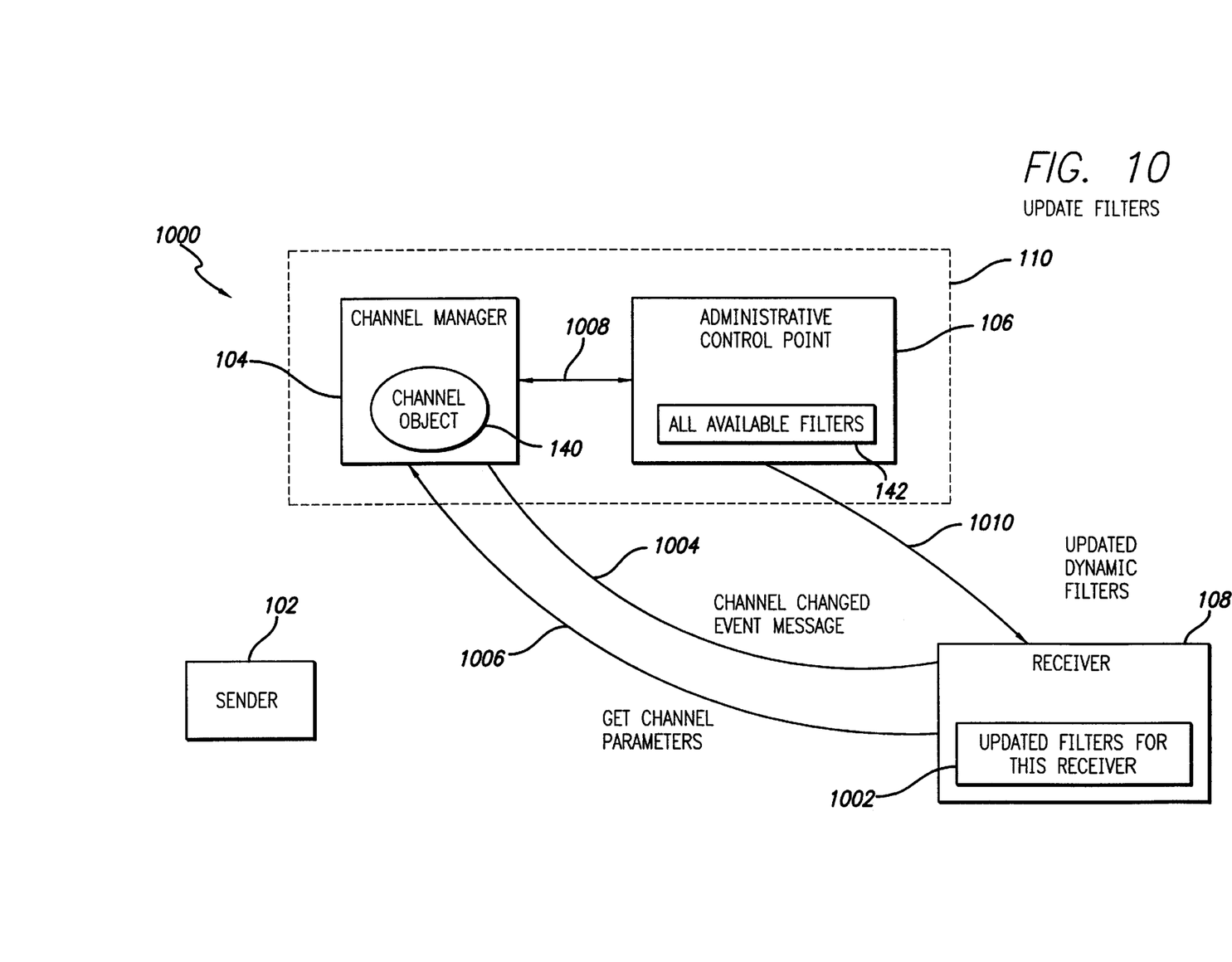
FIG. 10 is a block diagram of a network data processing system in accordance with an embodiment consistent with the present invention, showing steps performed to update the filters in a potential receiver.
Figure 11:
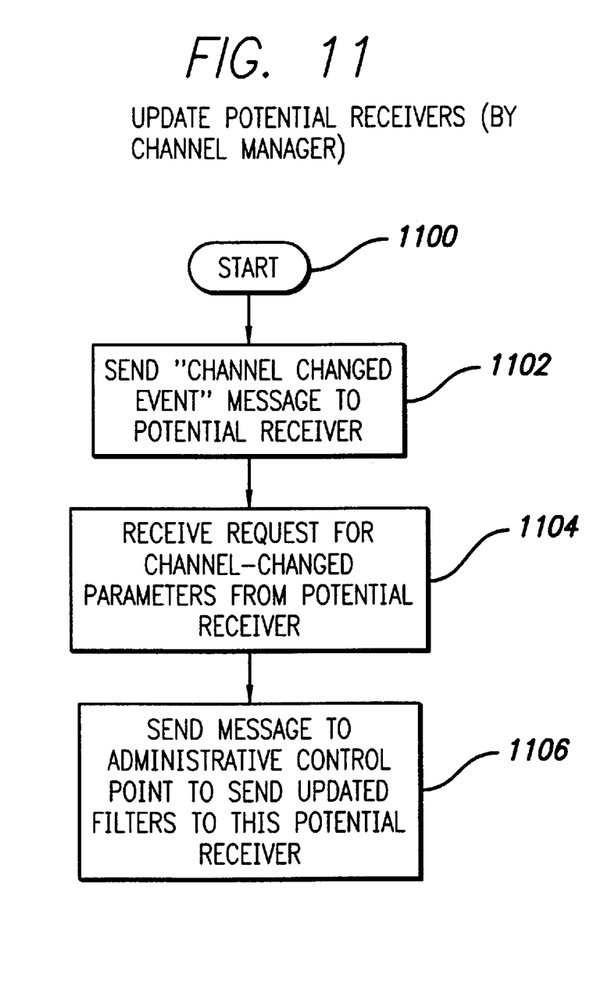
FIG. 11 is a flow chart showing steps performed by the Channel Manager to update filters.
Figure 12:
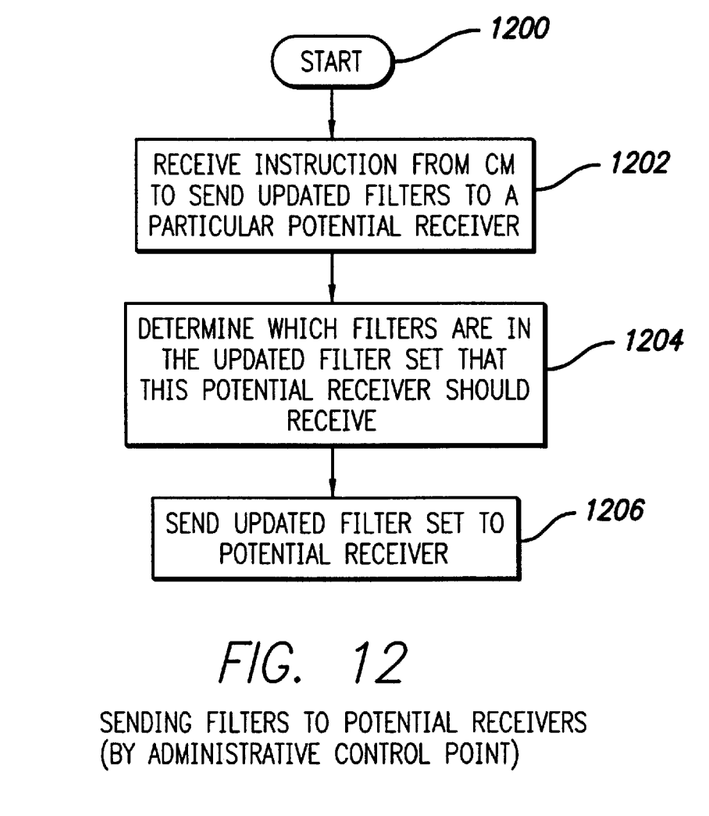
FIG. 12 is a flow chart showing steps performed by the Administrative Control Point to update filters.

After initial filters have been sent to potential receivers, the described embodiment also allows ACP 106 to update the filters in the receivers. In the example of FIG. 10, this update function is performed during a "channel change" operation, although the update could be performed at any appropriate time or as a regularly scheduled event. FIG. 10 is a block diagram of a network data processing system in accordance with an embodiment consistent with the present invention, showing steps performed to update the filters in a multicast channel environment. FIG. 11 is a flow chart 1100 showing steps performed by the Channel Manager to update filters. FIG. 12 is a flow chart 1200 showing steps performed by the Administrative Control Point to update filters.

In the example, CM 104 sends a "channel changed event" message 1004 to the receivers 108 in step 1102, which in turn send a "channel parameters" message 1006, received by CM 104 in step 1104. CM 104 then sends a command or instruction to ACP 106 in step 1106, which causes the ACP 106 to perform the steps of FIG. 12. It should be noted that the present invention can work in conjunction with a number of systems that multicast data to receivers, such as computer systems, television systems, information systems, and/or audio systems. The present invention is not limited to the described channel system, which is provided by way of example.

In step 1202, ACP 106 receives the instruction or command from CM 104 to update the filters. In an embodiment consistent with the present invention, the CM instructs ACP 106 to update the filter set of a particular receiver, e.g., the receiver that has just registered. In another embodiment consistent with the present invention, CM 104 instructs ACP 106 to update the filters of more than one receiver. In yet another embodiment consistent with the present invention, ACP 106 periodically updates the filter sets of all receivers, either at a command from CM 104 or upon the occurrence of a predetermined time or event. These periodically updated filters can be unicast or multicast to the receivers. In step 1204, ACP 106 determines which filters are in the set of updated filters for the receiver(s) and, in step 1206, sends these updated filters to the receiver(s). In various implementations of the present invention, the updated filters are either added to existing filters or replace existing filters. Yet another embodiment consistent with the present invention, allows ACP 106 to send a command changing the order of the existing filters in a potential receiver, without having to resend the filter contents.

In at least one embodiment consistent with the present invention, different filter sets are sent to the receiver depending on which channel the receiver has registered for. A receiver may be sent more than one set of filters if it registers for more than one channel. As an example, if a receiver registers for a movie channel and for a music channel, the receiver will receive two different sets of filters. When data is received by the receiver, the receiver/filters determines the source/channel of the data and applies the correct set of filters.

In summary, the described embodiments of the present invention allow at least one intermediate Administrative Control Point to control the filters that are sent to potential multicast receivers in a network system. In at least one described embodiment, filters are sent to a receiver when the receiver registers to receive a content channel. Updated filters can also be sent by the ACP to a receiver at other appropriate times. The fact that each receiver has its own set of dynamic filters means that the sender can efficiently send data via multicasting, but that each receiver is able to tailor the received data to meet its needs.

Receivers can be, for example, end user systems, firewalls, or network boundary points. Dynamic filters can be, for example, configuration parameters, executable software modules, or downloadable Java classes.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims and equivalents.

What is claimed is:

1. A method performed by an Administrative Control Point in a data processing network system, comprising the steps of:

receiving an indication that a potential receiver of data in a group of potential receivers of data is ready to receive data;

determining a set of filters for the potential receiver;

determining an order in which the set of filters is to be applied to the data; and sending the set of filters and the order to the potential receiver.

2. The method of claim 1, wherein the sending step includes the step of unicasting the set of filters to the potential receiver.

3. The method of claim 1, wherein the set of filters includes configuration parameters.

4. The method of claim 1, wherein the set of filters includes executable software modules.

5. The method of claim 1, wherein the set of filters includes downloadable Java classes.

6. The method of claim 1, wherein the determining an order step includes setting each filter in the set of filters to invoke the next lowest filter in the set of filters.

7. The method of claim 1, wherein the determining a set of filters step includes the step of selecting the same predetermined set of filters for all receivers in a subgroup of the potential receivers.

8. The method of claim 1, wherein the determining a set of filters step includes the step of selecting a filter set including a filter that augments received data.

9. The method of claim 1, wherein the determining a set of filters step includes the step of selecting a filter set including a filter that changes received data.

10. The method of claim 1, wherein the determining a set of filters step includes the step of selecting a filter set including a filter that passes through data that meet predetermined filter criteria.

11. The method of claim 1, wherein the step of receiving an indication that a potential receiver of data in a group of potential receivers of data is ready to receive data includes the step of:

receiving an indication that the potential receiver has registered to receive a channel in a multicasting channel network.

12. The method of claim 1, wherein the step of receiving an indication that a potential receiver of data in a group of potential receivers of data is ready to receive data includes the step of:

receiving an indication that the potential receiver has registered to receive a channel in a network in which data sent by one sender is received by more than one receiver.

13. The method of claim 1, further including the steps of:

registering the potential receiver, by a Channel Manager, to receive a multicast data channel; and sending, by the Channel Manager to the Administrative Control Point, the indication that the potential receiver of data in the group of potential receivers of data is ready to receive data.

14. The method of claim 13, wherein the Channel Manager and the Administrative Control Point are resident on separate data processing systems.

15. The method of claim 1, further comprising the steps of:

receiving an indication that the potential receiver of data in the group of potential receivers of data is ready to receive a second type of data;

determining, in accordance with the second type of data, a second set of filters and a second order for the potential receiver; and sending the second set of filters and the second order to the potential receiver.

16. The method of claim 1, further comprising the steps of:

receiving an indication that a second potential receiver of data in the group of potential receivers of data is ready to receive data;

determining a second set of filters and a second order for the second potential receiver; and sending the second set of filters and the second order to the second potential receiver.

17. A method, performed in a data processing network system, comprising the steps of:

determining, by an Administrative Control Point, an order in which a set of filters is to be applied to data;

sending, by the Administrative Control Point, the set of filters to a potential receiver of data in a group of potential receivers of data;

receiving, by the potential receiver, the data from a sender; and filtering, by the potential receiver, the received data in accordance with the set of filters and the order received from the Administrative Control Point.

18. A method, performed in a data processing network system, comprising the steps of:

determining, by an Administrative Control Point, an order in which a set of filters is to be applied to data;

receiving the set of filters, by a receiver in a group of potential receivers of data, from the Administrative Control Point;

receiving, by the receiver, the data from a sender; and filtering, by the receiver, the received data in accordance with the set of filters and the order received from the Administrative Control Point.

19. The method of claim 18, wherein the set of filters includes configuration parameters.

20. The method of claim 18, wherein the set of filters includes executable software modules.

21. The method of claim 18, wherein the set of filters includes downloadable Java classes.

22. The method of claim 18, wherein the receiving step includes the step of receiving the same predetermined set of filters for all receivers in a subgroup of the receivers.

23. The method of claim 18, wherein the receiving step includes the step of receiving a filter set including a filter that augments received data.

24. The method of claim 18, wherein the receiving step includes the step of receiving a filter set including a filter that changes received data.

25. The method of claim 18, wherein the receiving step includes the step of receiving a filter set including a filter that passes through data that meet predetermined filter criteria.

26. An Administrative Control Point in a data processing network system, comprising:

a portion configured to receive an indication that a potential receiver of data in a group of potential receivers of data is ready to receive data;

a portion configured to determine a set of filters for the potential receiver;

a portion configured to determine an order in which the set of filters is to be applied to the data; and a portion configured to send the set of filters and the order to the potential receiver.

27. An Administrative Control Point in a data processing network system, comprising:

means for receiving an indication that a potential receiver of data in a group of potential receivers of data is ready to receive data;

means for determining a set of filters for the potential receiver;

means for determining an order in which the set of filters is to be applied to the data; and means for sending the set of filters and the order to the potential receiver.

28. A receiver in a data processing network system, comprising:

a portion configured to receive a set of filters and an order from an Administrative Control Point;

a portion configured to receive data from a sender; and a portion configured to filter the received data in accordance with the set of filters in the order received from the Administrative Control Point.

29. A receiver in a data processing network system, comprising:

means for receiving a set of filters and an order from an Administrative Control Point;

means for receiving data from a sender; and means for filtering the received data in accordance with the set of filters in the order received from the Administrative Control Point.

30. A computer program product comprising:

a computer usable medium having computer readable code embodied therein for implementing a filter-sending portion of an Administrative Control Point (ACP) in a data processing network system, the computer program product including:

computer readable program code devices configured to cause a computer to effect receiving an indication that a potential receiver of data in a group of potential receivers of data is ready to receive data;

computer readable program code devices configured to cause a computer to effect determining a set of filters for the potential receiver;

computer readable program code devices configured to cause a computer to effect determining an order in which the set of filters is to be applied to the data; and computer readable program code devices configured to cause a computer to effect sending the set of filters and the order to the potential receiver.

31. A computer program product comprising:

a computer usable medium having computer readable code embodied therein for implementing a receiver in a data processing network system, the computer program product including:

computer readable program code devices configured to receive a set of filters and an order, by the receiver, of data from an Administrative Control Point;

computer readable program code devices configured to receive, by the receiver, data from a sender; and computer readable program code devices configured to filter, by the receiver, the received data in accordance with the set of filters and the order received from the Administrative Control Point.

32. A computer data signal embodied in a carrier wave and representing sequences of instructions which, when executed by a processor, cause the processor to dynamically send filters by performing, by an Administrative Control Point, the steps of:

receiving an indication that a potential receiver of data in a group of potential receivers of data is ready to receive data;

determining a set of filters for the potential receiver;

determining an order in which the set of filters is to be applied to the data; and sending the set of filters and the order to the potential receiver.

33. A computer data signal embodied in a carrier wave and representing sequences of instructions which, when executed by a processor, cause the processor to receive filters, by performing, by a receiver, the steps of:

receiving a set of filters and an order from an Administrative Control Point;

receiving data from a sender; and filtering the received data in accordance with the set of filters and the order received from the Administrative Control Point.

* * * * *